Nov. 2, 1943.   J. L. DOUGLASS   2,333,157
TUBE COUPLING
Filed Aug. 10, 1942

INVENTOR
James L. Douglass
BY
Evans + McCoy
ATTORNEYS

Patented Nov. 2, 1943

2,333,157

UNITED STATES PATENT OFFICE 2,333,157

TUBE COUPLING

James L. Douglass, Cleveland Heights, Ohio

Application August 10, 1942, Serial No. 454,231

8 Claims. (Cl. 285—86)

This application is a continuation-in-part of my prior application Serial No. 355,886, filed September 9, 1940, now Patent No. 2,310,944, February 16, 1943. The invention relates to tube couplings of the jam-type in which a male member is bored to receive a tube and is jammed or expanded by pressure due to an inner inclined surface against an internally threaded member to cause wedging of the members together, so that they will not be loosened due to vibration.

Couplings of the jam-type have heretofore been proposed and widely used in the manufacture of airplanes and especially in positions where there is liklihood of loosening due to vibration. Jam-type couplings heretofore proposed are exceedingly difficult to manufacture for the reason that a trepanning operation is required to prepare the inwardly projecting tapered sealing seats. The trepanning operation is so difficult that it is almost impossible to manufacture couplings in production from the stainless steels and tough materials which are almost essential in certain chemical apparatus and the like. In any case, the preparation of a trepanned seat materially reduces the number of couplings that can be manufactured in a given time by automatic machining. It also requires special tools.

It is an object of the present invention to provide a jam-type coupling which can be manufactured in quantity production without the use of special tools.

It is another object of the present invention to provide jam-type couplings for use in joining two tubes together which will withstand practical pressures, which have no appreciable tendency to loosen due to vibration, and which permit the use of the harder metals in quantity production.

It is another object of the present invention to provide jam-type tube couplings which may be prepared from hard materials, such as stainless steel, and which serve to join stainless steel tubes together in a leakproof non-corrosive joint.

It is a further object of the present invention to provide a coupling in which only an inner portion of the coupling may be made of a non-corrosive metal to afford a non-corrosive path for corrosive fluid.

It is a still further object of the present invention to provide a coupling for joining two tubes together which can be readily and economically produced and which can be readily assembled in hidden positions without danger of misalignment of parts.

It is still another object of the present invention to provide a coupling which has a locking action due to relative yieldability or expansion of parts and which permits flow of metal of the tube without weakening or interfering with the joint produced.

Other objects and advantages will be apparent from the following detailed description of the invention as illustrated in the accompanying drawing, in which.

Figure 1:
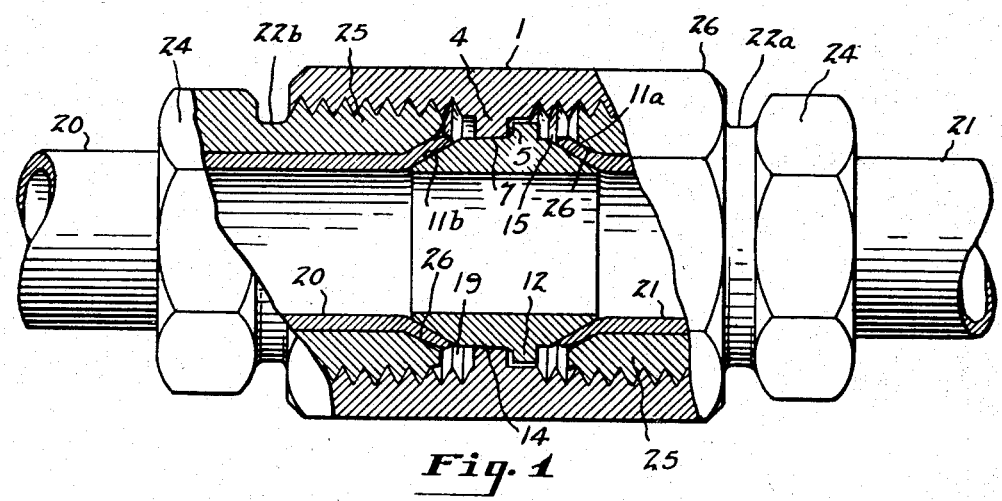
Figure 1 is an elevational view, partly in section, of a coupling embodying the present invention, showing portions of two tubes in joined position.
Figure 2:
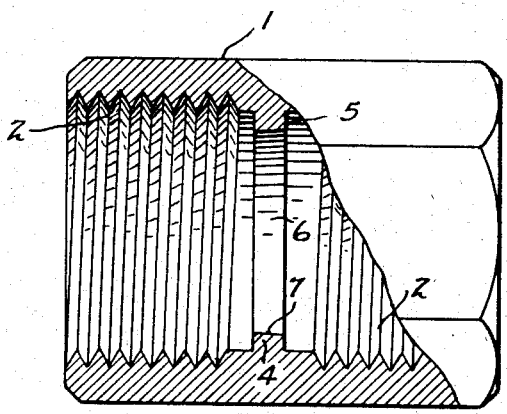
Fig. 2 is an elevational view, with portions removed, of one of the elements of the coupling embodying the present invention.
Figure 3:
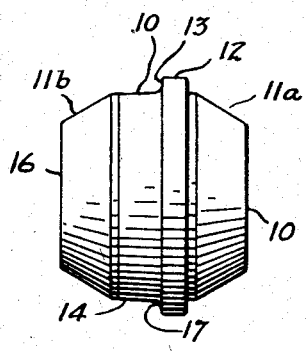
Fig. 3 is an elevational view of an internal element of the couplings embodying the present invention.

Referring more particularly to the drawing, in which like parts are designated by like numerals of reference throughout the several views, couplings embodying the present invention have a central tubular body 1, preferably with a polygonal outer surface to provide suitable wrenchlands and with a longitudinal bore therethrough. The central tubular body 1 has an internal female threaded portion 2 at each end thereof and a restricted portion 4 intermediate the threaded portions 2. The restricted portion 4 has a shoulder 5 on at least one side thereof and has a bore or opening 6 substantially concentric with the bore at the threaded portions 2. The surface of the restricted bore 6 is preferably tapered longitudinally as indicated at 7.

An internal tubular sealing member 10 having an over-all diameter at least slightly less than the internal diameter of one of the threaded portions 2 of the central tubular body 1 is provided to bear against and form a seal with the internal flared surfaces of the end of each tube. The internal annular tubular sealing member has an intermediate aligning portion with integral oppositely disposed tapered sealing surfaces 11 at each end thereof. The annular central aligning portion preferably is relatively thick and preferably has an annular integral aligning rib 12 with a shoulder portion 13 at one side portion thereof and has a tapered surface portion 14 which, although generally longitudinal or axial, has a slight taper of about two to ten degrees or so. One end of said tapered surface 14, fartherest removed from said shoulder 13, is of less diameter than the smallest diameter of said restricted portion of said body 11, one portion adjacent said shoulder 13 is of slightly larger diameter than the diameter of the restricted opening in said body 1. Thus, when a selected end 16 of said sealing member is protruded through said restricted opening and longitudinal pressure is applied against the seating surface 11a at the other end portion of said sealing member 10, the latter is wedged into said central tubular body and said sealing surfaces of said sealing member are maintained substantially concentric within the threaded bores of said body 1.

The shoulder 13 serves as means associated with the aligning portion of the sealing member to prevent the latter from entirely passing through said restricted opening by pressure on the surface 11a. Preferably, means such as a fillet 17 at the juncture of the aligning surface 14 with the shoulder 13 is provided to prevent the shoulder 13 from coming into contact with the shoulder 5 of the central tubular body.

The longitudinal length of the surface 7 or the width of the wall of the restricted portion of the body 1 is less than the longitudinal distance over said aligning surface 14 between the tapered sealing surface 11b and the fillet 17 or shoulder 13, so that when the sealing member is positioned in the body 1 the tapered surface 11b is spaced from the restricted portion 4 to provide a space 19 for the flow of any excess metal from a tube 20. A space 15 is provided between the surface 11a and the rib 12 for the flow of metal from the tube 21. The axial length of the surface 7 that comes in contact with the aligning surface 14 of the internal sealing member, is preferably relatively small compared to the diameter of the sealing member so that a slight rocking action will be permitted. The fillet 17 which serves to space the shoulder 13 from the shoulder 5 cooperates with the relatively short surface 7 to permit rocking of the sealing member within the central tubular body 1 so that the slight variation in alignment of the sealing surfaces 11a and 11b with respect to the bore of the male members 22 may be made.

The male members 22a and 22b may be identical and each has a wrench-engaging portion 24 and adjacent one end portion an externally threaded portion 25, which is adapted to interfit with the internal threaded portion of the tubular body 1. Each of the male members 22 is longitudinally bored to receive a tube 20 or 21, which may be of any desirable material such as copper, aluminum, stainless steel, etc. Adjacent the threaded end portion 25 an internal conical sealing surface 26 is provided. The surface 26 is adapted to bear against or engage the external surface of the flared end of one of the tubes 20 or 21 to clamp said tube tightly against one of the sealing surfaces 11a or 11b of the sealing member.

The sealing member of couplings adapted to join non-corrosive tubings, such as stainless steel tubes, may be of stainless steel; the remaining portions of the couplings may be of a less expensive metal, such as steel, brass, aluminum, etc. without having any corrosive material in a position where it might contact any corrosive fluid within the tubes 20 or 21. It is thus seen that a great saving in the expensive metal may be effected without any disadvantage.

Since the aligning surface 14 is tapered and adapted to be wedged within the restricted opening of the portion 4 of the sealing member, it is apparent that the sealing member 10 may be assembled in position within the tubular body 1 at any time after manufacture, so that the body 1 and the sealing member act as a unitary structure. The joints may thus be readily assembled behind obstructions in places where it is impossible to visually make certain that the members are in alignment.

In making joints with the couplings of the present invention the tubing is extended through the bore within the male members 22 and the end flared as shown. The sealing member is inserted through the bore of the marked end 26 of the body 1 and the male member 22a is threaded within the body so that the tube 21 is squeezed between the surface 11a and the tapered surface 26 of the male member. The male member 22b is then threaded into the opposite end of the female member so that the tube 20 is pressed between the surface 11b and the surface 26 to form an annular seal. When the members 22a and 22b are tightened, the threaded ends of the male members are expanded in diameter by the inclined surface 11b, so that the threads of the male member are jammed tightly against the female threads 2 in the member 1. This jamming action is exceptionally important as it substantially prevents loosening of the coupling by vibration.

Because the inclined seats 11a and 11b are on the exterior of an internal annular sealing member and since the body 1 contains no inclined sealing surfaces that require a trepanning operation, the above couplings may be produced with simple machine operations without special tools from any machinable metal. Each of the parts of the coupling of the present invention may be readily and rapidly produced on automatic machines.

Although several embodiments of the invention have been herein shown and described, it will be understood that numerous modifications of the construction shown may be resorted to without departing from the spirit of this invention as defined in the appended claims.

What I claim is:

1. A tube coupling having a central tubular body internally threaded at each end thereof, said body having between said threaded portions an internal portion with a restricted bore of less diameter but concentric with the bore of the threaded portion, said restricted bore being longitudinally tapered over a portion of its surface, an internal one-piece metal tubular sealing member having an intermediate annular aligning portion and having an annular tapered sealing surface at each end thereof extending away from said aligning portion and adapted to enter into and engage the flared end of a tube, said aligning portion being adapted to extend into said restricted bore and having means associated therewith to prevent said sealing member from passing through said restricted bore, said aligning portion being adapted to cooperate with said restricted bore to maintain said sealing member substantially concentric with the bore of said threaded portions when a selected end of said sealing member is pressed longitudinally into engagement with the restricted bore, and male members each having a wrench-engaging portion and an externally threaded portion for threaded engagement with one of said threaded portions of said body, each of said male members being longitudinally bored to receive and support a tube and being provided with an internal conical sealing surface near its threaded end portion for bearing against the external surface of the flared end of said tube and for clamping said tube against one of said sealing surfaces of said sealing member.

2. A tube coupling having a central tubular body internally threaded at each end thereof, said body having between said threaded portions an internal portion with a restricted bore of less diameter but substantially concentric with the bore of the threaded portions, said restricted bore being longitudinally tapered over a portion of its surface, an internal tubular sealing member having an intermediate annular aligning portion with an external annular aligning shoulder thereon and having an annular tapered sealing surface at each end thereof, extending away from said shoulder and said aligning portion and adapted to extend into and engage the flared end of a tube, said aligning portion having an annular tapered aligning surface between said shoulder and one of said tapered sealing surfaces, one portion of said aligning surface being of less diameter than the opening in said restricted bore of said body and one portion being of greater diameter than the smallest diameter of said restricted portion, so that said sealing member may be wedged into said body by longitudinal pressure against one of said sealing surfaces, and male members each having a wrench-engaging portion and an externally threaded portion for threaded engagement with one threaded portion of said body, each of said male members being longitudinally bored to receive and support a tube and being provided with an internal conical sealing surface adjacent its threaded end portion for bearing against the external surface of the flared end of said tube and for clamping said tube against one of said sealing surfaces of said tubular member.

3. A tube coupling having a central external tubular body internally threaded at each end thereof, said body having between said threaded portions an internal portion with a restricted bore of less diameter but substantially concentric with the bore of said threaded portions, an internal annular tubular sealing member having an intermediate, relatively thick, annular aligning portion having an external annular aligning rib thereon and an annular tapered sealing surface at each end thereof, said tapered sealing surfaces extending away from said aligning portion, each tapered surface being adapted to extend into and engage the flared end of a tube, said aligning portion having at one side of said rib an annular tapered aligning surface dimensioned to wedge into said restricted bore of said body when a selected end of said sealing member is inserted into said restricted bore and when longitudinal pressure is applied on one of said sealing surfaces, and male members each having a wrench-engaging portion and an externally threaded portion for threaded engagement with one internally threaded portion of said body and each of said male members being longitudinally bored to receive and support a tube and being provided with an internal conical sealing surface near its threaded end portion for bearing against the external surface of the flared end of said tube and for clamping said tube against one of said sealing surfaces of said tubular member.

4. A tube coupling having a central tubular body internally threaded at each end thereof, said body having between said threaded portions an internal portion with a restricted bore of less diameter but substantially concentric with the bore of the threaded portions, said restricted bore being longitudinally tapered over a portion of its surface, an internal tubular sealing member having an intermediate annular aligning portion with an external annular aligning rib thereon and having an annular tapered sealing surface at each end thereof, each of said tapered sealing surfaces being spaced from said rib and being adapted to extend into and engage the flared end of a tube, said annular aligning surface of said sealing member being dimensioned to cooperate with said restricted bore so that when a selected end of said sealing member is protruded through said restricted bore and longitudinal pressure is applied against the sealing surface at the other end of said sealing member, said sealing surfaces of said tubular member are maintained substantially concentric with the threaded bores of said body, male members each having a wrench-engaging portion and an externally threaded portion for threaded engagement with one threaded portion of said body, each of said male members being longitudinally bored to receive and support a tube and being provided with an internal conical sealing surface adjacent its threaded end portion for bearing against the external surface of the flared end of said tube and for clamping said tube against one of said sealing surfaces of said tubular member.

5. A tube coupling having a central tubular body internally threaded at each end thereof, said body having between said threaded portions an internal portion with a restricted bore of less diameter but substantially concentric with the bore of said threaded portions, an internal annular tubular sealing member having an intermediate annular aligning portion and an annular tapered sealing surface at each end thereof, said tapered sealing surfaces extending away from said aligning portion, each tapered surface being adapted to extend into and engage the flared end of a tube, said aligning portion carrying an annular rib and having at one side of said rib an annular tapered aligning surface dimensioned to wedge into said restricted bore of said body when a selected end of said sealing member is inserted into said restricted bore and when longitudinal pressure is applied on one of said sealing surfaces, male members each having a wrench-engaging portion and an externally threaded portion for threaded engagement with one threaded portion of said body, each of said male members being longitudinally bored to receive and support a tube and being provided with an internal conical sealing surface adjacent its threaded end portion for bearing against the external surface of the flared end of said tube and for clamping said tube against one of said sealing surfaces of said tubular member.

6. A tube coupling having a central tubular body internally threaded at each end thereof, said body having between said threaded portions an internal portion with a restricted bore of less diameter but substantially concentric with the bore of said threaded portions, an internal tubular sealing member having an intermediate annular aligning portion, having an annular tapered sealing surface at each end thereof extending away from said aligning portion and adapted to enter into and engage the flared end of a tube, said aligning portion being adapted to extend into said restricted bore of said body and having means associated therewith to prevent said tubular member from passing through said restricted bore, said aligning portion being adapted to cooperate with said restricted bore to maintain said sealing member substantially concentric with the bore of the threaded portions of the body when a selected end of said sealing member is pressed longitudinally through said restricted bore, male members each having a wrench-engaging portion and an externally threaded portion for threaded engagement with one threaded portion of said body, each of said male members being longitudinally bored to receive and support a tube and being provided with an internal conical sealing surface adjacent its threaded end portion for bearing against the external surface of the flared end of said tube and for clamping said tube against one of said sealing surfaces of said tubular member.

7. A tube coupling having a central tubular body internally threaded at each end thereof, said body having between said threaded portions an internal portion with a restricted bore of less diameter but substantially concentric with the bore of the threaded portions, said restricted bore being longitudinally tapered over a portion of its surface, an internal tubular sealing member having an intermediate annular aligning portion with an external annular aligning shoulder thereon and having annular tapered sealing surfaces at each end thereof, said tapered sealing surfaces extending away from said shoulder and said aligning portion and adapted to extend into and engage the flared end of the tube, said aligning portion having an annular tapered aligning surface between said shoulder and one of said tapered sealing surfaces, one portion of said aligning surface being of less diameter than the said restricted bore and one portion being of greater diameter than the smallest diameter of said restricted bore, so that said sealing member may be wedged into said body by longitudinal pressure against one of said sealing surfaces, the width of the wall of said restricted bore being less than the distance over said aligning surface between said tapered sealing surface and said shoulder of said sealing member, male members each having a wrench-engaging portion and an externally threaded portion for threaded engagement with one threaded portion of said body, each of said male members being longitudinally bored to receive and support a tube and being provided with an internal conical sealing surface adjacent its threaded end portion for bearing against the external surface of the flared end of said tube and for clamping said tube against one of said sealing surfaces of said tubular member.

8. The coupling of claim 2 wherein the internal tubular sealing member is a single unitary piece of metal.

JAMES L. DOUGLASS.